United States Patent [19]

Leach

[11] Patent Number: 4,496,669
[45] Date of Patent: * Jan. 29, 1985

[54] METHOD OF MAKING CELLULAR CROSSLINKED POLY(DICYCLOPENTADIENE)

[75] Inventor: Douglas R. Leach, Newark, Del.

[73] Assignee: Hercules Incorporated, Wilmington, Del.

[*] Notice: The portion of the term of this patent subsequent to Jul. 3, 2002 has been disclaimed.

[21] Appl. No.: 623,307

[22] Filed: Jun. 21, 1984

Related U.S. Application Data

[63] Continuation of Ser. No. 552,872, Nov. 17, 1983, Pat. No. 4,458,037.

[51] Int. Cl.$^3$ .............................. C08J 9/14; C08F 4/78
[52] U.S. Cl. ...................................... 521/93; 521/124; 521/139; 521/140; 521/149; 521/150; 525/211; 525/289; 526/77; 526/142; 526/169; 526/283
[58] Field of Search ................. 521/93, 124, 139, 140, 521/149, 150; 525/211, 289; 526/77, 142, 169, 283

[56] References Cited

U.S. PATENT DOCUMENTS

| | | | |
|---|---|---|---|
| 4,002,815 | 1/1977 | Minchak | 526/169 |
| 4,029,840 | 6/1977 | Shikinami et al. | 521/150 |
| 4,400,340 | 8/1983 | Klosiewicz | 526/77 |

*Primary Examiner*—Morton Foelak
*Attorney, Agent, or Firm*—Jeffrey F. Craft; Dale R. Lovercheck

[57] ABSTRACT

Disclosed is an improved method of making a cellular crosslinked polymer with a metathesis-catalyst system where a metathesis-catalyst is activated with an alkylaluminum iodide compound.

In a preferred embodiment, two parts of the metathesis-catalyst system form the basis for two solutions, a catalyst/monomer solution and an alkylaluminum iodide activator/monomer solution. At least one solution also contains a blowing agent. The solutions are combined in one place, such as the mixing head of a reaction injection molding machine, and then injected into another place, such as a mold, where the monomer reacts to form a cellular crosslinked polymer.

12 Claims, No Drawings

METHOD OF MAKING CELLULAR CROSSLINKED POLY(DICYCLOPENTADIENE)

This application is a continuation of application Ser. No. 552,872, filed Nov. 17, 1983, U.S. Pat. No. 4,458,037, issued July 3, 1984.

BACKGROUND OF THE INVENTION

This invention relates to the chemical arts. In particular, this invention relates to an improved method of making a cellular crosslinked polymer of dicyclopentadiene with a metathesis-catalyst system.

U.S. Pat. No. 4,002,815 discloses the use of a metathesis-catalyst system which employs a dialkylaluminum iodide, an alkylaluminum diiodide or a mixture of trialkylaluminum compounds with elemental iodine to produce substantially gel-free copolymers of cyclopentene and dicyclopentadiene.

U.S. application Ser. No. 526,835 filed Aug. 26, 1983 and assigned to the same assignee, discloses a cellular crosslinked poly(dicyclopentadiene) which is made with a metathesis-catalyst system. The cellular polymer is made by injecting the catalyst system, which includes an alkylaluminum activator, into a reaction vessel which is preheated, preferably to a temperature from about 100° C. to about 125° C.

Now it has been found that the activation of a metathesis-catalyst with an alkylaluminum iodide compound results in a catalyst system capable of polymerizing dicyclopentadiene monomer into a cellular crosslinked polymer having good uniformity of structure without having to preheat the reaction vessel to high temperatures.

BRIEF DESCRIPTION OF THE PREFERRED EMBODIMENTS

In an improved method of making a cellular crosslinked poly(dicyclopentadiene), dicyclopentadiene monomer is catalyzed with a two part metathesis-catalyst system, the first part of metathesis-catalyst, the second part an alkylaluminum iodide activator. In a preferred embodiment, the two metathesis-catalyst parts, plus the monomer and a blowing agent, form the basis of at least two separate reactant streams which can be mixed in one place, such as the mixing head of a reaction injection molding machine, and then injected into another place, such as a mold, where the monomer sets up into a cellular crosslinked polymer.

DETAILED DESCRIPTION OF THE INVENTION

A metathesis-catalyst system is employed to polymerize dicyclopentadiene monomer in such a manner that the resulting product is a cellular crosslinked polymer. The preferred monomer is dicyclopentadiene (3a,4,7,7a-tetrahydro-4,7-methano-1H-indene).

In the preferred embodiment the cellular crosslinked polymer is formed entirely from dicyclopentadiene (hereinafter referred to as DCPD) monomer. In other embodiments the cellular crosslinked polyer is formed from DCPD monomer and up to about 20% of one or more other cycloolefin monomers, where the cycloolefin monomer contains from about five to about twelve carbon atoms. Representative cycloolefin monomers include norbornene, norbornadiene, cyclopentene, dimethanehexahydronaphthalene, and dimethaneoctahydronaphthalene.

The polymerization of the DCPD is catalyzed by a two part metathesis-catalyst system. One part contains a metathesis-catalyst such as a tungsten containing metathesis-catalyst. The catalyst is preferably a tungsten halide or tungsten oxyhalide, most preferably $WCl_6$ or $WOCl_4$.

The other part contains an alkylaluminum iodide activator. The alkylaluminum iodide activator is an alkylaluminum dihalide, dialkylaluminum halide or a mixture of a trialkylaluminum and elemental iodine, where the alkyl group contains one to twelve carbon atoms. In the preferred activators, the alkyl group is ethyl. The most preferred activator is diethyl aluminum iodide.

The metathesis-catalyst, as described above, is preferably in solution with the monomer or mixture of monomer to be polymerized. In a preferred embodiment, a tungsten containing catalyst is first added to a small amount of a solvent to form a slurry. The solvent must not be susceptible to reacting with the tungsten containing catalyst. Representative solvents include benzene, xylene, toluene, chlorobenzene, dichlorobenzene, trichlorobenzene and hexane. Sufficient solvent is added so that the tungsten concentration is between about 0.1 and 0.7 mole per liter of solvent.

The tungsten containing catalyst is then made soluble in the slurry by the addition to the slurry of a small amount of an alcohol or a phenol compound. Phenols are preferred. Suitable phenols include phenol, alkylphenols, and halogen containing phenols, with tert-butyl phenol, tert-octyl phenol and nonyl phenol being most preferred. The preferred molar ratio of tungsten:phenol is from about 1:1 to about 1:3. The catalyst/phenol solution can be made by adding the phenol to the catalyst slurry, stirring the resulting solution and then blowing a stream of a dry inert gas through the solution to remove any gases which may be formed. Alternatively, a phenolic salt, such as a lithium or sodium phenoxide, can be added to the catalyst slurry, the mixture stirred until essentially all the catalyst is dissolved, and the precipitated inorganic salt removed by filtration or centrifugation. All of these steps should be carried out in the absence of moisture and air to prevent deactivation of the catalyst.

In some embodiments of the invention, it is desirable to increase the shelf-life of the catalyst solution. This is done by adding from about 1 to about 5 moles of a complexing agent, such as a Lewis base or a chelating agent, per mole of tungsten, to the tungsten containing catalyst solution. Preferred Lewis bases include nitriles and ethers such as benzonitrile and tetrahydrofuran. Preferred chelants include acetylacetones and alkyl acetoacetates, where the alkyl group contains from one to ten carbon atoms.

The improvement in the shelf-life of the tungsten containing catalyst is obtained whether the complexing agent is added before or after the phenol is added.

The alkylaluminum iodide activator, as described above, is also preferably in solution with the monomer or mixture of monomers to be polymerized. A rate moderator is often added to the activator/monomer solution so that when the activator is mixed with the catalyst/monomer solution, the polymerization does not initiate instantaneously and the polymer is not formed too rapidly. The onset of polymerization is delayed by adding a moderator to the activator/monomer solution. Ethers, esters, ketones and nitriles are representative rate moderators for the alkylaluminum compounds. Isopropyl ether, tetrahydrofuran and benzonitrile are examples of preferred rate moderators. Ethyl benzoate and butyl ether are most preferred. The preferred ratio of the alkylaluminum iodide to rate moderator is from about 1:0.5 to about 1:5 on a molar basis.

A blowing agent is incorporated into the catalyst system in order that a product having a cellular structure is formed during polymerization. Any of the conventional blowing agents used in reaction injection molding (hereinafter referred to as RIM) processes or related processes may be employed provided that the blowing agent does not poison or otherwise adversely affect the metathesis-catalyst system. Preferred blowing agents include low boiling organic compounds, i.e. compounds which are liquids under ambient conditions but which are volatilized under polymerization conditions, and inert gases. Representative low boiling organic compounds include hydrocarbons such as pentane and hexane, and halogenated hydrocarbons such as methylene chloride and trichlorofluoromethane. Representative inert gases include nitrogen, argon and fluorinated hydrocarbons, such as dichlorodifluoromethane.

The blowing agent is incorporated into either or both parts of the metathesis-catalyst system, or it may be added to the monomer separately. The amount of blowing agent to be incorporated is from about 2 to about 30, preferably from about 5 to about 20, percent by weight based on the weight of the monomer. The greater the amount of blowing agent used the less dense the final cellular crosslinked polymer produced.

The components of the catalyst system of this invention are combined so that the resulting DCPD to tungsten ratio, on a molar basis, is from about 1,000:1 to about 10,000:1, preferably about 2,000:1 and so that the resulting aluminum to a tungsten ratio, on a molar basis, will be from about 2:1 to about 20:1, preferably about 10:1.

The exact amounts of catalyst, alkylaluminum iodide, activator and blowing agent to be incorporated into a given catalyst system will depend on the particular catalyst, alkylaluminum iodide activator and blowing agent chosen as well as the desired final product. The amounts will be readily determinable by one skilled in the art without undue experimentation following the teachings of this specification.

In some embodiments, the cellular crosslinked polymer of this invention is made and molded by RIM or related processes. The two parts of the metathesis-catalyst system are separately mixed with monomer and blowing agent to form two stable solutions which are placed in separate vessels. These vessels provide the source for separate streams. The two streams are combined in one place, such as a RIM machine's mixing head, and then injected into a second place, such as a mold where polymerization takes place.

The invention is not intended to be limited to embodiments employing two streams each containing monomer and blowing agent. It will be obvious to one skilled in the art that there may be situations where it is desirable to have monomer incorporated in just one stream or to employ a plurality of streams where the additional streams contain monomer or additives or both.

In a preferred embodiment, the streams are combined in the mixing head of a RIM machine. Mixing is easy to achieve because the process involves low molecular weight, rapidly diffusing components. Typically the mixing heads have orifices about 0.032 inch in diameter are a jet velocity of about 400 ft/sec. After being combined, the mixture is injected into a mold maintained from about 30° C. to about 80° C. The mold pressure is in the range of about 10–15 psi. A rapid exothermic reaction occurs. Typically, the cellular crosslinked polymer is formed in from about 10 seconds to about 10 minutes. It has been found that exotherm caused by the polymerization is sufficiently great and occurs at the proper time so that it is not necessary to preheat the mold to temperatures greater than about 80° C.

In some embodiments a nucleating agent, such as calcium carbonate, is added to at least one of the reactant streams. The nucleating agent affects the structure of the foam by helping to make the foam cells small and uniform. Other suitable nucleating agents include talc, magnesium carbonate, barium carbonate, zinc carbonate, lead carbonate, magnesium oxide, calcium oxide, barium oxide, zinc oxide, lead oxide and silica. The preferred nucleating agent is silica.

In some embodiments, a preformed elastomer is added to the metathesis-catalyst system. The addition of an elastomer serves to increase the viscosity of the reactant streams and improve the impact resistance of the final polymeric product. The elastomer can be dissolved in either or both of the reactant streams in an amount of from about 3 to about 15 weight percent based on weight of the monomer. Illustrative elastomers include natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber and ethylene-propylene diene terpolymers. The amount of elastomer used is determined by its molecular weight and is limited by the viscosity of the resultant reactant streams. The reactant streams containing elastomer cannot be so viscous that mixing is not possible. Although the elastomer can be dissolved in either one or both of the streams, it is desirable that it be dissolved in both.

In some embodiments the reactant streams and consequently the final polymer may also contain fillers. Representative fillers include glass, wollastonite, mica, carbon black, talc and calcium carbonate.

The best mode now contemplated of carrying out this invention is exemplified by the following working examples of preferred specific embodiments. This invention is not limited to these specific examples. All weights and volumes are percentages, based on the weight or volume of DCPD unless otherwise clearly indicated.

EXAMPLES 1–3

Examples 1–3 illustrate preferred embodiments of polymerizing DCPD to a cellular crosslinked polymer using a tungsten hexachloride catalyst, a diethylaluminum iodide activator, a blowing agent, a nucleating agent and optionally a styrene-butadiene random rubber.

In each example, 1–3, 0.5 g. of a fine particulate silica is added to a 25 × 150 mm test tube which is then capped and inerted with nitrogen. 10 g. of DCPD is then syringed into the capped test tube. In examples 2 and 3, styrene-butadiene random rubber is dissolved in the DCPD prior to the addition of DCPD to the test tube. Next, a blowing agent is added to the test tube by transferring a measured volume of condensed liquid through a stainless steel cannula. The contents are then heated to 40° C. by placing the test tube in a heated bath. 0.13 ml of a 0.85 molar solution of diethylaluminum iodide in toluene which also contains butyl ether, in a diethylaluminum iodide to butyl ether molar ratio of 1:1.2, is then added to the heated mixture. Finally, 0.38 ml of a 0.1 molar solution of tungsten hexachloride/nonylphenol/acetylacetone, having a molar ratio of 1:1:2, in toluene is added to the heated mixture. The contents are then mixed with a vortex mixer. The test tube is vented and the contents allowed to polymerize and expand into a cellular crosslinked poly(dicyclopentadiene). Table 1 indicates the particular blowing agent and amount used as well as the amount, if any, of styrene-butadiene random rubber dissolved in the dicyclopentadiene.

TABLE 1

| Examples | 1 | 2 | 3 |
|---|---|---|---|
| DCPD, grams | 10.0 | 10.0 | 10.0 |
| 0.1 M $WCl_6$ solution (ml) | 0.38 | 0.38 | 0.38 |
| 0.85 M $Et_2AlI$ solution (ml) | 0.13 | 0.13 | 0.13 |
| Silica (weight percent) | $0.5^{(1)}$ | $0.5^{(2)}$ | $0.5^{(3)}$ |
| Blowing agent | $CFCl_3$ | $CH_2Cl_2$ | $CF_2Cl_2$ |
| (volume percent) | 15 | 5 | 5 |
| Styrene-butadiene random rubber (weight percent) | — | 3 | 6 |

[1] Cabosil MS-5 (manufactured by Cabot Corp., Boston, MA)
[2] Cabosil EH-5 (manufactured by Cabot Corp., Boston, MA)
[3] Cabosil MS-7 (manufactured by Cabot Corp., Boston, MA)

EXAMPLE 4

This example illustrates a preferred embodiment of the synthesis of cellular poly(DCPD) via reaction injection molding where the catalyst system is activated with diethylaluminum iodide ($Et_2AlI$).

Poly(DCPD) is made using a standard RIM machine manufactured by Accuratio Co. of Jeffersonville, Ind. Into two tanks having a capacity of two gallons each is charged DCPD containing 6% by weight of a random styrene-butadiene rubber. The tanks are then closed and inerted with nitrogen. Sufficient $Et_2AlI$ is transferred into one of the tanks to bring the $Et_2AlI$ concentration to 0.053 molar and sufficient di-n-butyl ether added to the same tank to achieve an ether to $Et_2AlI$ ratio of 1.2:1. Next, to the other tank is added sufficient $WCl_6$/nonyl-phenol/acetylacetone catalyst, having a molar ratio of 1:1:2, in toluene to provide a 0.0071 molar concentration. Added to each tank is sufficient fluorotrichloromethane to achieve a concentration of 5 parts per hundred, based on the weight of the DCPD, and sufficient fine particulate silica (Cab-O-Sil EH-5, manufactured by Cabot Corp., Boston, Mass.) to achieve a concentration of 0.5 parts per hundred, based on the weight of DCPD. All transfers are done in a way to preclude the entrance of oxygen or moisture into the system. The materials are then thoroughly blended in their respective tanks.

The components of the two tanks are combined in a standard impingement type RIM mixhead. The ratio of the activator/monomer solution mixed with catalyst/monomer solution is 1:1. The impingement mixing is accomplished by passing both the solutions through orifices 0.032" in diameter at a flow rate approximately 80 ml/sec. This requires pumping pressure of approximately 1000 psi.

The resulting mixture flows directly into a mold heated between 40° C. and 80° C. The mold is made out of chrome plated aluminum. The mode has a flat cavity which forms a plaque sample $10'' \times 10'' \times \frac{1}{8}''$ thick. A clamping force of 1.5 tons is used to keep the mold closed. The reactants polymerize rapidly in the closed mold, reaction being substantially complete in about two minutes. The mold is open and a cellular DCPD is recovered. A cellular crosslinked DCPD is formed.

What I claim and desire to protect by Letters Patent is:

1. A foamed cross-linked polymerized dicyclopentadiene polymer composition comprising:
    (a) cross-linked polymerized dicyclopentadiene polymer; and
    (b) a dialkylaluminum iodide component.
2. The composition of claim 1 further comprising an elastomer.
3. The composition of claim 1 further comprising at least one additional polymerized cycloolefin.
4. The composition of claim 1 wherein said dialkylaluminum iodide compound is diethylaluminum iodide.
5. The composition of claim 3 wherein said cycloolefin is norbornene, norbornadiene or cyclopentadiene.
6. A polymerization feed composition comprising dicyclopentadiene and a dialkylaluminum iodide compound.
7. The composition of claim 6 wherein said dialkylaluminum iodide compound is diethylaluminum iodide.
8. The composition of claim 6 further comprising an elastomer.
9. The composition of claim 6 further comprising a catalyst.
10. The composition of claim 6 further comprising at least one additional cycloolefin monomer.
11. The composition of claim 9 wherein said catalyst is $WCl_6$ or $WOCl_4$.
12. The composition of claim 10 wherein said additional cycloolefin monomer is norbornene, norbornadiene or cyclopentene.

* * * * *